Patented Sept. 30, 1941

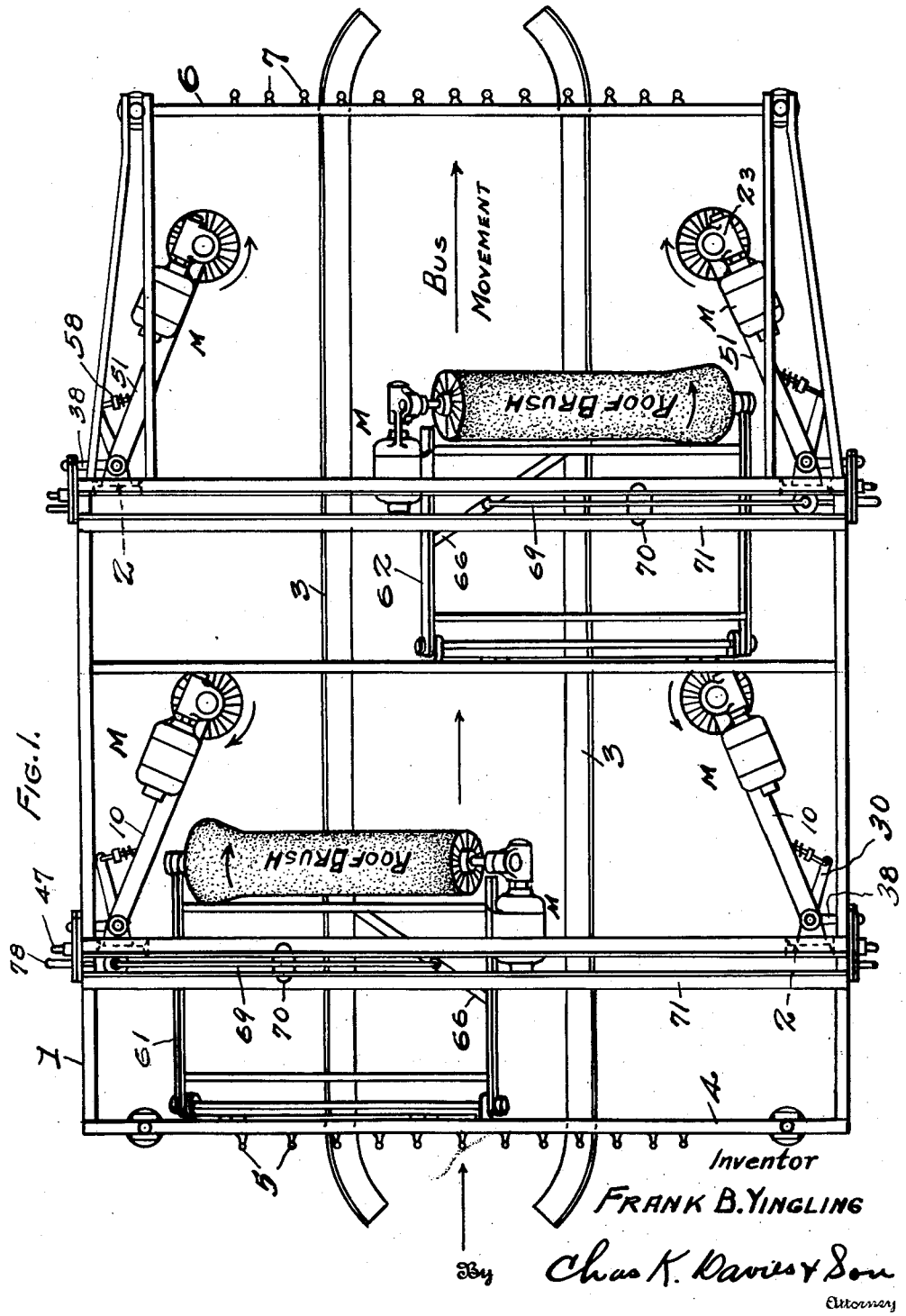

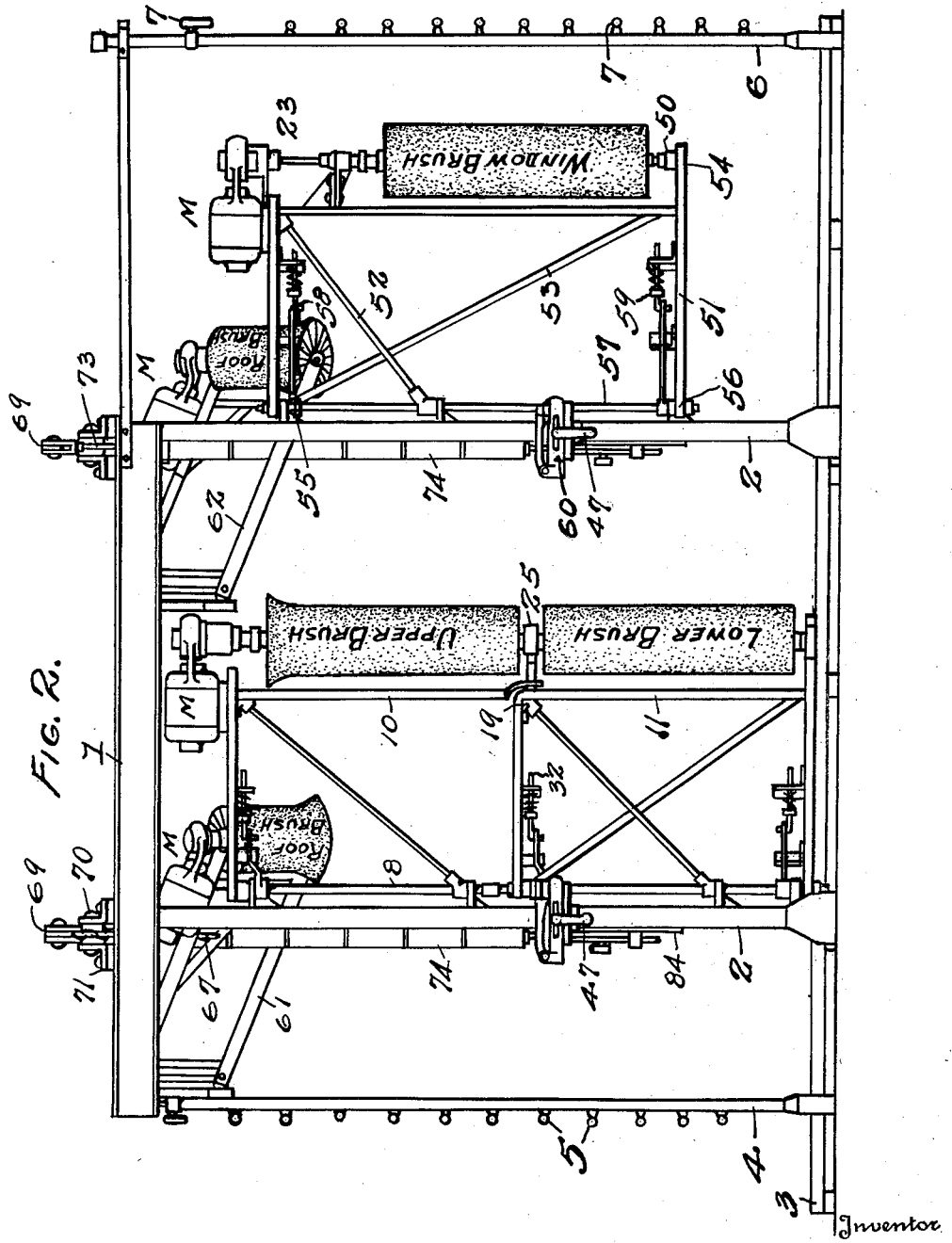

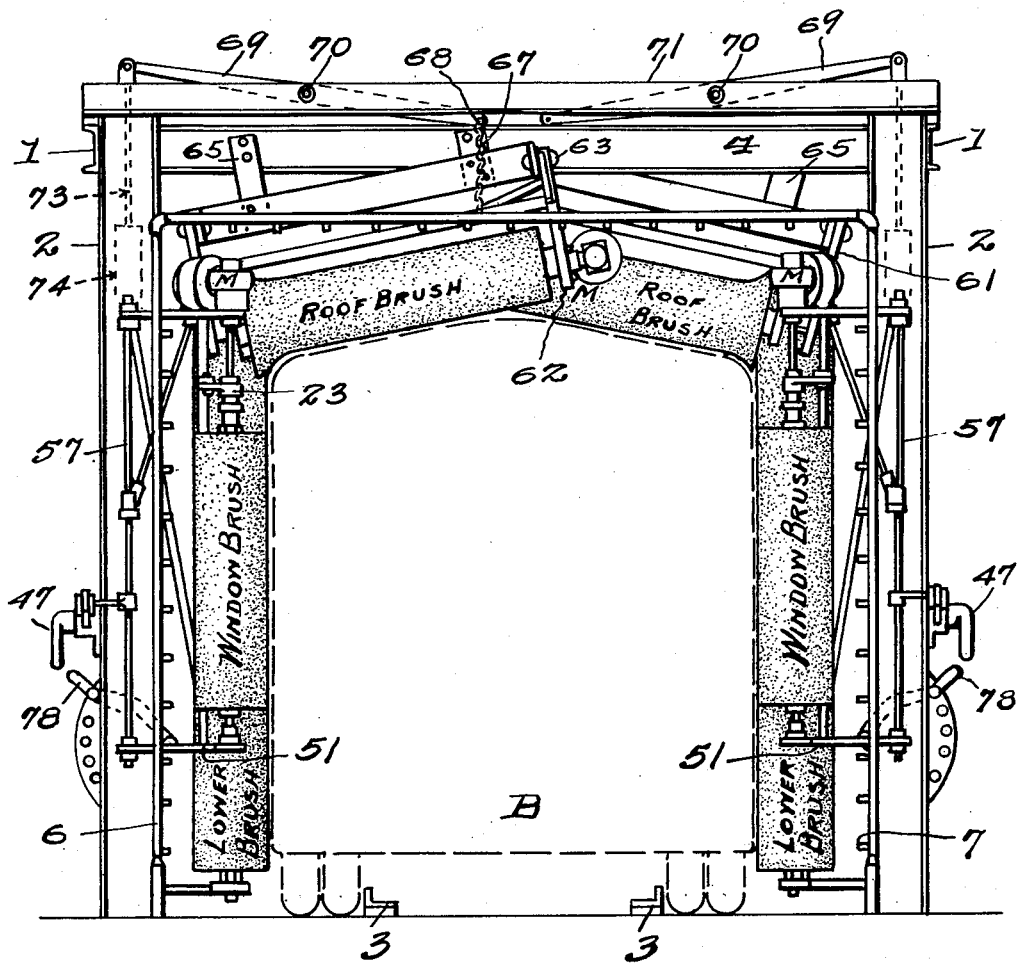

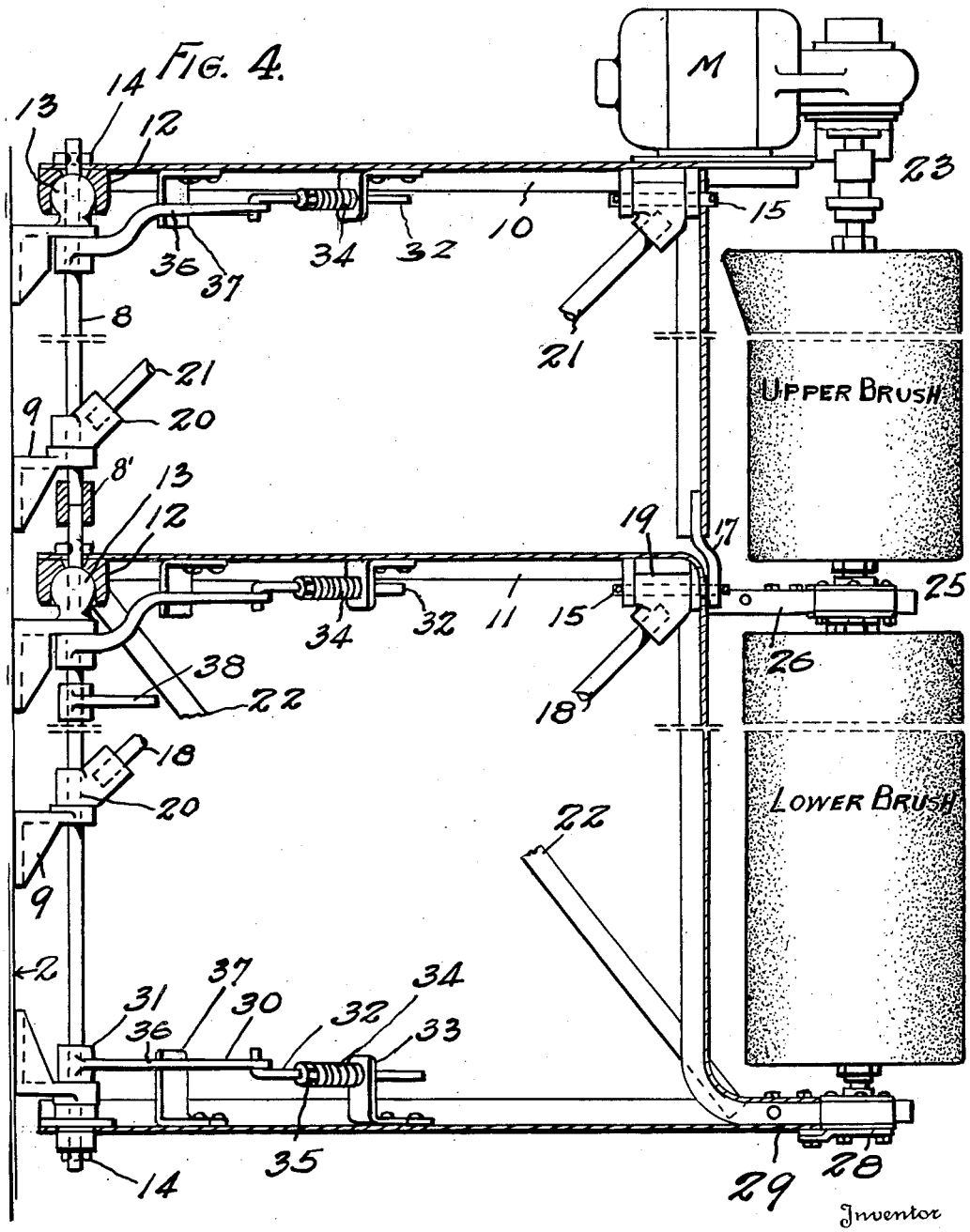

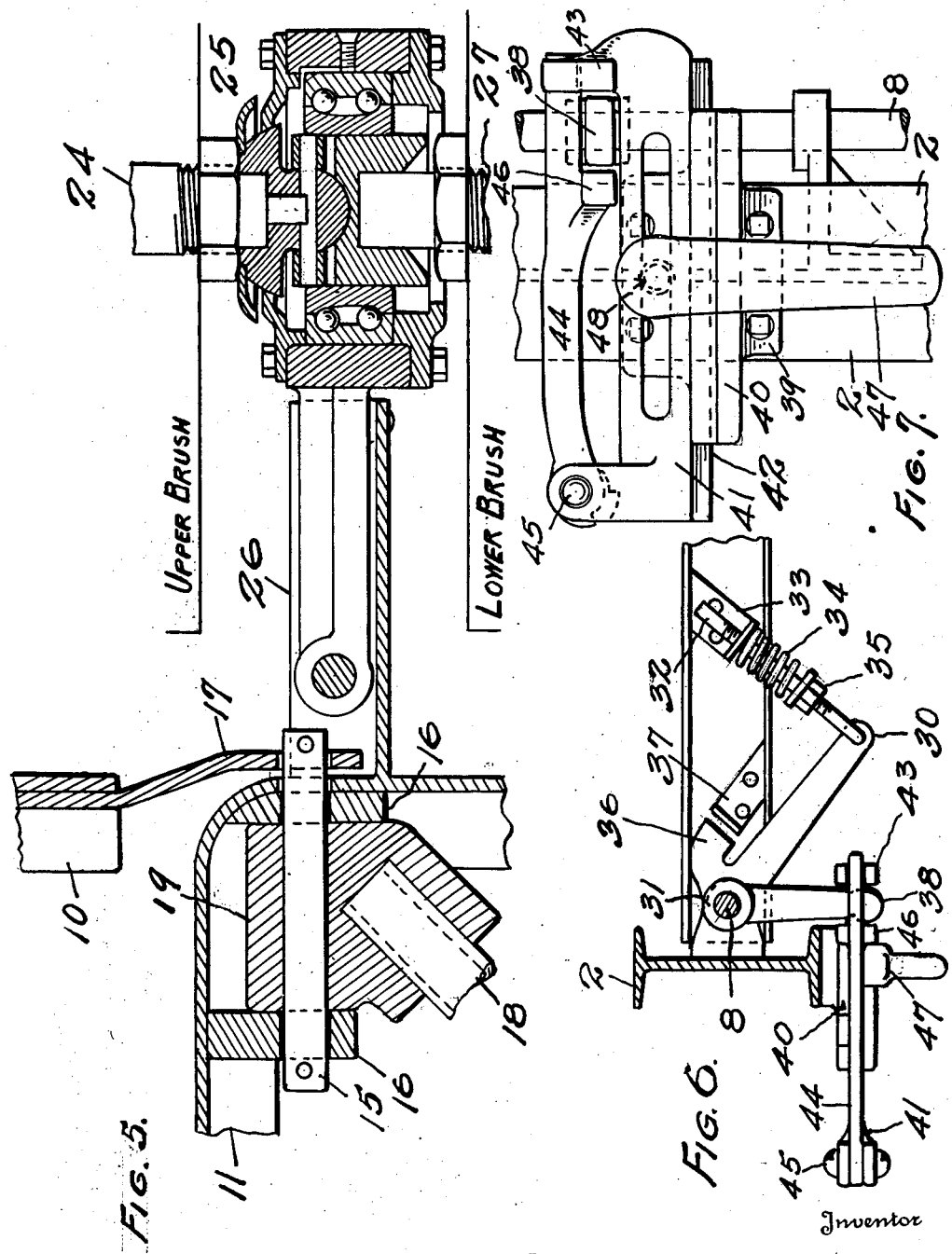

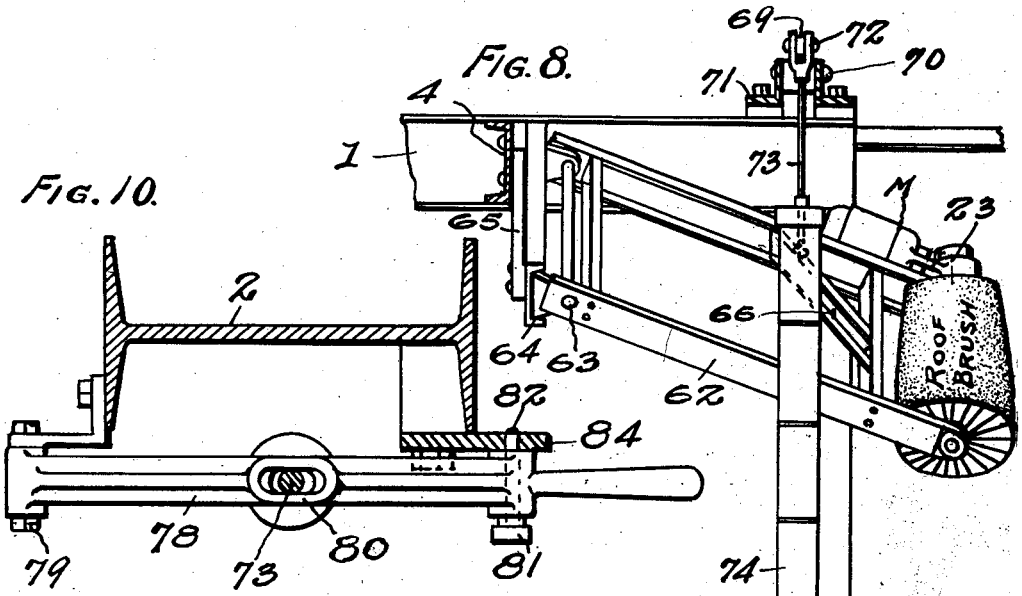
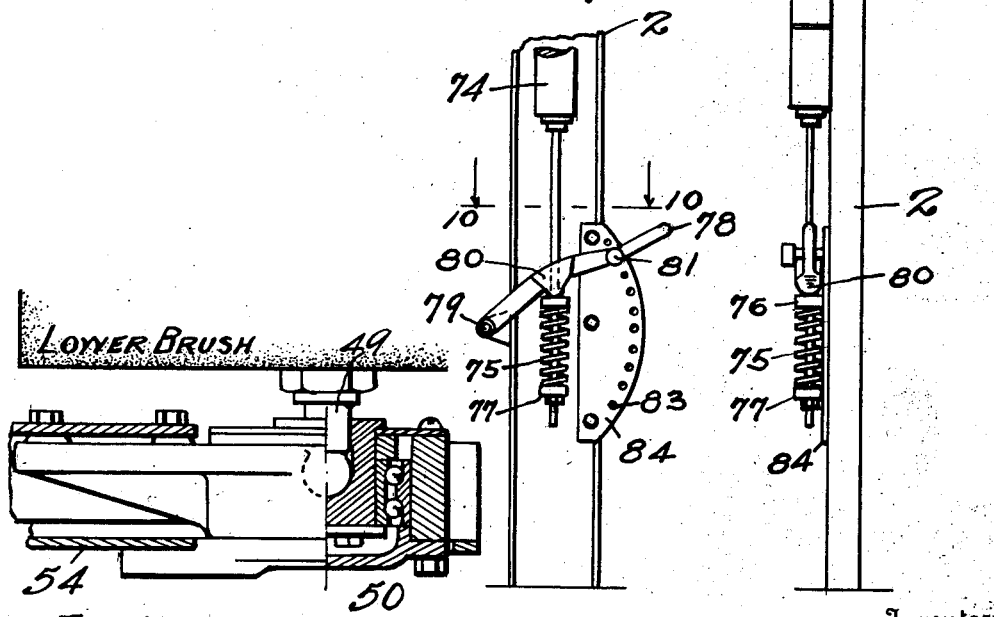

2,257,255

UNITED STATES PATENT OFFICE 2,257,255

VEHICLE WASHER

Frank B. Yingling, Hamilton, Ohio

Application February 28, 1938, Serial No. 193,173

8 Claims. (Cl. 15—53)

The present invention relates to an improved vehicle washer which, while especially designed for brushing or scrubbing the exterior portions of various types of busses and railway cars as herein illustrated, is also readily adaptable for mechanically washing other vehicles. For convenience in illustrating and describing, the vehicle is referred to as a bus, which moves through the washing machine and is showered or sprinkled with water; rotary brushing units are operated for cleansing or washing the exterior sides and roof of the bus; and a final rinsing shower of water is applied to the cleansed bus as it emerges from the washing machine.

Two sets or units are employed, one unit at each side of the longitudinal center of the washing machine, and each unit includes a number of brushes and sets of brushes having their vertical axes journaled in bearings supported in laterally swinging brush frames. The several brushes, some in sets, are operated by individual motors mounted on the several brush-frames, and these motors may be controlled manually, automatically controlled, or controlled in other suitable manner.

The brush-frames may be swung on their axes by manually operated means, for setting the brushes in operative position to wash the vehicle and to retract the brushes from operative position. The brushing units are also automatically adjusted to the surface to be washed by contact from the moving bus as it enters and passes through the washing machine, and after the units have been set in pre-determined position, depending upon the width and height of the bus.

Both the roof units and the side units, after having been set in predetermined position, are pushed away from the bus by contact therewith, against a yielding pressure, and under the yielding pressure the brushes are held in operative position against the surfaces of the vehicle or bus to be washed.

The rotary brushes of the units, arranged in sets (here shown as two to a set) and referred to as body-brushes, are mounted in hinged, yieldingly mounted on the main frame and having means adapted to resiliently urge the brushes, toward the bus and to automatically adapt themselves to the contour of the exterior sides of the bus to insure cleansing of the sides from end to end, and also the side windows of the bus. For this purpose the vertically arranged pairs of brushes and their complementary motors are mounted in two spring-pressed, swivel-frames, hinged in such manner that each frame may move independently of the other and yield under lateral pressure from the bus. If the vertical side walls of the bus are straight or plane surfaces, and if the bus rolls through the machine in plumb perpendicular position, these frames and brushes assume a straight perpendicular position for scrubbing or washing the sides and windows of the bus. However, if the bus leans slightly to one side, or should structural bulges and other irregularities be present in the side faces of the bus, these flexible brushing units automatically adapt themselves to and compensate for the irregularities, to insure complete and thorough cleansing, and to avoid undue wear or distortion of the brushes.

Heretofore, in mechanical washing machines, difficulties have been encountered in simultaneously and thoroughly washing the side windows of the bus with the body of the bus, and to accomplish this end, in addition to the flexible mountings of the body brushes, I utilize a window brushing unit at each side of the washing machine, preferably at the rear of the flexible-frame units of the body brushes. These window brushes are located at a height intermediate the upper and lower ends of the sets of body brushes, and by means of these window brushes, all portions of the successively passing windows are thoroughly cleansed.

By the co-operation of the roof brushes, the body brushes and the window brushes, the exterior surfaces of the bus are quickly and thoroughly cleansed as the bus passes through the machine or apparatus; the several units of the machine may be controlled with facility and they operate with efficiency in the performance of their functions. Due to the simplicity in construction and operation of the units of the machine, the latter may be assembled, and adapted to various sizes or capacities, by varying the number of units employed, and as the units are constructed in standardized right and left hand parts they may be manufactured at comparatively low cost of production.

The invention consists essentially in certain novel combinations and arrangements of parts as will hereinafter be more fully set forth. In the accompanying drawings I have illustrated one complete example of the physical embodiment of my invention, adapted for washing a bus, in which the parts are combined and arranged according to one mode I have so far devised for the practical application of the principles of the invention, and the drawings and description are illustrative and descriptive of the invention, rather than limiting the invention to any specific showing.

It will be understood that while the exemplifying bus washer, as illustrated, is in successful operation, changes and alterations may be made, and are contemplated, in the construction and operation of the washer, within the scope of my claims, without departing from the principles of the invention.

Figure 1 is a plan view showing the bus washer embodying my invention, illustrating by arrows the travel of the bus through the washer, and the rotary movement of the several brushes.

Figure 2 is a view in side elevation of the washer, disclosing the flexible frames of the body brushes, the roof brushes, and one of the window brushes.

Figure 3 is a view in elevation at the exit end of the mechanical washer, indicating by dash lines the outline of a bus, and showing the relative positions of the body, roof, and window brushes.

Figure 4 is an enlarged sectional, side view (with parts broken away for convenience of illustration), of one of the flexible frames, showing also the hinge rod or post, and one set of the motor-operated body brushes, and other features.

Figure 5 is an enlarged detail, vertical sectional view, showing the bearing and power transmission between two of the brush arbors, and one of the flexible joints between the upper section and the lower section of a flexible frame.

Figure 6 is a detail view showing one of the upright I-beams of the washer frame in horizontal section, and the spring arrangement and control for regulating the pressure of the brushes against the side of the bus.

Figure 7 is an enlarged side elevation of the slide device for manually regulating or adjusting the predetermined position of the brush frames.

Figure 8 is a detail side elevation, disclosing one of the overhead, tilted, roof brushes, with its counterbalanced, hinged frame, together with the adjusting lever mechanism for setting the brush in predetermined operative position with relation to the roof of the bus.

Figure 9 is a side elevation of the adjusting lever mechanism shown in Figure 8.

Figure 10 is an enlarged detail view showing one of the uprights or I-beams of the main frame, as at line 10—10 of Figure 9, and also showing a plan of the adjusting lever.

Figure 11 is a detail view partly in section, showing the type of bearing used at the lower end of a set of brushes in a flexible frame, as well as the bearing used at the lower end of a single brush as a window brush.

In the exemplifying structure I employ an overhead rectangular, rigid frame comprising horizontal channel beams 1 supported on upright I-beams 2 erected upon suitable bases or foundations, the frame parts being bolted together and arranged to provide a passageway for the bus that is designated B in Figure 3. Centrally spaced guide rails 3, 3, are laid on the floor or ground longitudinally of the frame, to guide the bus in operative position through the machine. At the left or entering end of the washer upright and horizontal water pipes 4 form an arch through which the bus passes, and these pipes, which receive their supply of water from a suitable source, are equipped with spray nozzles 5 for the purpose of showering or sprinkling the bus as it enters the machine from the left in Figures 1 and 2, and at the exit end of the machine a similar set of water pipes 6 with nozzles 7, are employed for a rinsing shower of the washed bus as it leaves the machine.

As seen in Figures 1, 2, and 3, at each side of the machine and in the upper portion of the frame, brushing units are arranged, to wash the opposite sides of the bus and its roof, and one of each of the two lateral units illustrated comprises a set or pair of brushes vertically arranged and indicated as an upper brush and a lower brush for washing the sides or body of the bus. Another unit, at each side of the machine, includes a single window brush to assist the body brushes, and especially to cleanse the side windows of the bus. The roof brushes include two units, arranged overhead, spaced longitudinally of the machine, and they extend in opposite directions transversely of the bus, preferably with a slight tilt from the horizontal.

The rotary brushes of each unit are operated by an electric motor M, the motors being mounted on the frames of the units, and these motors may be controlled through suitable connections in appropriate manner, the electrical connections and controlling parts being omitted from the drawings for convenience of illustrating the invention.

As indicated in Figure 2 and especially Figure 4, the upper and lower brushes forming a set of body brushes for washing the side of the bus from the roof down to the lower edge or skirt of the bus, include two units of similar construction and operation, and the description of one will suffice for both units.

A set of upper brushes and lower brushes is mounted in a hinged and swiveled frame that is spring-pressed toward the side of the bus, and at their adjoining ends the upper brush and the lower brush are in close proximity in order to provide a substantially continuous vertical brushing surface for the side of the bus.

In Figure 4 one of the swiveled, hinged, frames is illustrated in detail, as hinged upon the long hinge-pin or post 8, which is journaled in brackets 9 attached to an upright beam 2. The hinge pin or post 8, as seen in Figure 4 is made up of sections, the adjoining ends of which are rigidly united by a collar or sleeve 8'. The flexible frame comprises two sections 10 and 11, preferably of channel irons, and these frame sections each have a socket 12 fitting over a spherical head or ball 13 that is fixed to the upright beam of the frame. The hinge-pin or post passes through holes in the ball and socket joints, and cotter pins, as 14 are passed transversely through the post or pin for retaining the latter against displacement.

As best seen in Figure 5 the two sections 10 and 11 are connected at their adjoining free ends by means of a swivel coupling pin 15 which extends horizontally and is loosely fitted in bearing brackets 16 of the section 11, and this coupling pin passes through a hole in a vertically arranged tongue 17 that is welded or otherwise secured at the lower corner of the free end of the section 10. This coupling, which permits independent hinge movement between the upper section 10 and the lower section 11, is braced by a diagonally extending brace member 18 rigidly fitted at its upper end in a sleeve 19 loose on the coupling pin 15, and at its lower end the brace has a coupling head loose on the hinge-post 8. The sleeve 19 is located between the two spaced bearing brackets 16, 16 of the coupling pin, and this brace permits a limited flexing, laterally of the lower frame section.

A similar diagonally extending brace 21 is employed between the upper free corner of the upper section 10 and another coupling head 20 mounted on the post 8, and similar to the head 20 of the brace 18.

These two sections 10 and 11 constitute a flexible frame for the upper and lower brushes, the sections being supported on the hinge post by the ball and socket joints of the two sections. In addition, the loosely coupled diagonal braces 18 and 21 permit flexure of the frame, and preferably a diagonal strut, as 22, is extended from the ball and socket of the lower section to the lower free corner of this section, to prevent excessive flexing of the frame beyond the required degree.

These upper and lower brushes, which are axially alined, are mounted at the free ends of the frame-sections, and the operating motor M is mounted upon the upper part of the upper section, preferably with its driving mechanism 23 directly connected to the brush arbor 24 of the upper brush. As shown in Figure 5, a ball bearing and universal joint indicated at 25, are mounted in an extension 26 of the frame section 11, to connect the upper arbor 24 with the arbor 27 of the lower brush, and a similar bearing joint, as 28 is provided for the lower end of the lower arbor, which bearing joint is mounted in an extension 29 of the lower section 11 of the flexible frame.

These body brushes, as indicated by the arrows in Figure 1 are revolved by their motors in a direction opposite to that of the travel of the bus through the machine, and the brushes are yieldingly held toward the opposite sides of the bus so that the bus in entering and passing through the machine, will contact with the brushes and push the brushes and their frames outwardly against spring pressure, thereby insuring proper position for the brushes to work effectively upon the sides of the passing bus.

The flexing of the frame, and the flexing of the axially alined set of brushes in the frame, permit the brushes to adapt themselves to the exterior surfaces of the sides of the bus, regardless of vertical irregularities of the bus.

The body brushes and their frames, as well as the window brushes and their frames, are first adjusted to operative position with relation to the sides of the bus to be washed, by manually controlled means, before the bus enters the washing machine. This adjustment utilizes spring devices which are regulated to vary the amount of pressure placed against the brushes, or vary the degree of pressure of the brushes against the bus as the latter passes through the machine. The spring devices include compression springs, the strength or tension of which determine the reaction of the brush against the side of the bus, and these spring devices are mounted on each of the body-brush frames and the window-brush frames.

Each section of the flexible frame is equipped with the required number of spring devices to hold the flexed frame and the flexed set of brushes, with a yielding pressure in operative position, three of the devices being shown in Figure 4, and these devices are regulated or adjusted by a manually operated control device in connection with the hinge-post 8.

Each spring device includes a lever 30 fixed at 31 on the hinge-post, and a spring bolt 32 is hinged to the free end of the lever, with its outer end extending through a hole in a bracket or angle plate 33 fixed to the brush frame, the angularly disposed lever and bolt being also disposed at angles to the brush frame. A compression spring 34 is coiled about the bolt and interposed between an adjusting nut 35 on the bolt and the angle bracket 33, and, when the hinge post 8 and lever 30 are held stationary, the compressed spring tends to urge the frame and its brushes toward the side of the bus. The lever is also provided with a side arm 36 that is adapted to co-act with another angle bracket 37, also fixed on the brush frame, when the frame is being retracted or withdrawn from operative position. When the frame and brushes are in operative position, there is a gap and a slight play between the side arm 36 of the lever arm and the angle bracket 37 to provide for a yielding pressure by the bus on the brushes, that is, the frame and brushes can "give" outwardly against the tension of the compressed spring when the bus pushes against the side brushes.

The frames and brushes are moved to adjusted predetermined position, and the yielding pressure of the compressed springs is adjusted and regulated, for holding the brushes in working position, through the use of an adjusting or operating lever 38 that is keyed to the hinge-post 8 to turn therewith. This lever is manually controlled for swinging the frame and brushes into and out of operative position, and means are provided for holding the lever, rigidly, in adjusted position. In Figures 6 and 7 this holding device is shown as a latch attached to an upright beam 2 by means of a base plate 39 bolted to the beam and fashioned with a grooved flange 40, in which a horizontally disposed, slotted slide or holder 41 having a complementary bottom tongue 42, is mounted. The slide is mounted to fit beneath the free end of the operating lever 38, and it is fashioned with bearing lugs 43 disposed at one side of the free end of the lever. These laterally spaced bearing lugs form a notch or keeper on one end of the slide for the free end of a catch 44 that is pivoted at 45 on the other end of the slide. This catch or latch also has a pair of outspreading lateral bearing lugs as 46, which together with the lugs 43 of the slide confine the free end of the operating lever within the latch.

The slide on which the latch is mounted is movable longitudinally of the washer in the grooved base plate, and the slide may be locked, with the operating lever, in adjusted position by means of a handle-nut 47 that co-acts with a stud 48 on the base plate to clamp the slide to the base plate.

As indicated in the drawings, each of the lateral units of the washing machine is equipped with spring devices and a control device, all of which are of similar construction and operation, but arranged for right hand and left hand use.

The vertically arranged upper and lower brushes, forming a set, have their respective lower and upper ends as closely related as possible, being separated only by the flexible joint and ball bearing 25 for the brush-arbors between the brushes.

To compensate for the gap between the brushes and also to materially assist the brushes in thoroughly washing all parts of the successively passing windows of the bus, a window-brush unit is located at the rear of each of the body brush units, The body brushes (upper and lower) as indicated in Figure 1 turn in a direction opposite to that of the travel of the bus, and they not only wash the sides of the bus, but to an extent they are effective in washing the windows also. To insure access of revolving brushes to all parts of the windows, including glass, sashes, mullions etc. I find that by revolving the window brushes in a direction opposite to that of the body brushes and in the direction of travel of the bus, the efficiency of the washing machine is greatly enhanced.

Each window brush, with its motor M, driving mechanism 23, arbor 49, and bearing joint 50 (Fig. 11) is mounted in a frame 51 having diagonal braces 52 and struts 53, and the bearing 50 is mounted in an extension 54 at the lower free corner of the frame. The frame is swiveled at 55 and 56 on the hinge-post 57, and the latter is mounted on an I-beam 2, similar to the mounting of the hinge posts 8.

Each of the window-brush frames is provided with spring-devices, indicated at 58 and 59, and a control device 60 for the frame and brush is also employed, similar to the spring-devices and control devices of the body-brush frames, which have previously been described.

As indicated in the plan view Figure 1, two oppositely arranged rotary, roof brushes, which overlap slightly at the longitudinal center of the machine, are mounted at opposite sides of the machine, in the upper portion of the frame, in position for yielding contact with the roof of the brush, and they of course are designed to wash the roof of the bus. These roof brushes, each of which has an electric motor M and direct driving mechanism 23, are mounted in adjustable, counterbalanced frames 61 and 62, hinged at 63 on the hinge bars 64, and these hinge bars 64 are attached by bracket arms 65 to cross channel bars 4 of the main frame. The roof brushes and frames hang or depend from the upper part of the main frame, and they are preferably tilted from the horizontal, with their outer ends below the level of their inner ends, in order that the brushes may readily conform to the usual sloping roof of the bus.

These roof brushes and their hinged frames are counterweighted and adjustably supported, so that the revolving brushes are permitted to bear down upon the roof, with a yielding pressure, and with the desired frictional contact, to insure efficiency in brushing or scrubbing the roof surfaces.

Near the free end of each roof-brush frame a diagonally extending strut 66 is fixed, and the lower end of a suspending chain 67 is attached to this strut, the upper end of the chain being anchored at 68 to the inner end of a transversely arranged lever arm 69 that is centrally pivoted at 70 in a pair of parallel cross bars 71, of angle iron, fixed on top of the frame of the washer.

At the outer end of each lever, by a pivotal connection 72, a weight-rod 73 is suspended, and a suitable number of weights 74 are supported on the rod, their aggregate or total weight being less than the weight of the frame and brush, so that the brush has a tendency to swing downwardly on the roof of the bus, with an upwardly yielding pressure as the roof of the bus contacts therewith. This yieldable pressure of the roof brushes on the roof is adjusted, regulated, and governed, through the counterweighting arrangement for the frame and its brush, so that the roof brushes, as well as the body brushes and window brushes, automatically apply themselves to their work with efficiency.

As the body brushes and window brushes are adapted to be set in operative position for service with vehicles of varying width, so also are the roof brushes adapted to be set in predetermined operative position with relation to roofs of varying height, and thereafter the roof brushes adapt themselves with a yielding or yieldable pressure against the surface to be cleaned.

For this yielding or yieldable pressure I employ a coiled spring 75 located on the weight rod 73 below the weights 74 and interposed between adjustable collars or nuts 76 and 77 on the rod. The upper collar 76 is loose on the weight rod, and it forms a bearing for the fulcrum of an adjusting lever 78 that is pivoted at 79 in a bracket fixed on an I-beam or upright 2, and this lever is fashioned with a slotted bearing head 80 through which the weight-rod is passed. The bearing head rests upon the top of the collar 76, and it will be apparent that when the free end of the manually operated lever is depressed, the spring is first compressed and then the weighted rod is depressed, swinging one end of the lever 69 down and its other end up, the latter end being instrumental in lifting the brush frame on its hinges to elevate the roof brush. The roof frame and brush may thus be adjusted to predetermined operative position of the brush, so that the latter may be slightly lifted by the bus as its roof passes under and in contact with the brush, and this yielding or yieldable movement of the brush is absorbed by the compressed spring, as is the case with the spring devices of the lateral brushes.

The frame is locked in adjusted position through the use of a spring catch 81 and its pin 82 mounted near the free end of the adjusting lever, and the pin is adapted to engage in a selected one of an arcuate series of holes 83 in a segmental plate 84 which is bolted to the upright I-beam 2.

Thus the hinged roof-frames and their brushes, and the lateral frames with their body brushes and window brushes, are all adapted to be controlled and moved into and out of predetermined operative position, and the spring devices employed in connection with the various frames are regulated to control the amount or degree of pressure placed on the brushes for efficient work, as the bus passes between the brushes.

By mounting the articulated or flexible set of two (or more) brushes with a minimum space between adjoining ends of brushes a greater length of effective brushing surface is provided, especially when irregularities are encountered along the sides of a bus or car, or when the bus is not in exactly plumb position.

The mounting of a motor on each individual unit, with its direct drive and reducer for speed, the flexible or universal bearing joints between arbors of the articulated sets, as well as in the rigid frame units, and the enclosure of these bearings and joints in grease tight containers that provide for lubrication as well as protection to the operating parts, all enhance the convenience in assembling parts, constructing the washer, and in operating the washer.

While the exemplified structure in actual practice is successful in performing its functions, it will be understood that changes and alterations may be made in the invention, within my appended claims, without departing from the principles of the invention.

Having thus fully described my invention, what I claim as new and desire to secure by Letters Patent is:

1. In a vehicle washer, the combination with a main frame and an upright hinge post, of a brush frame comprising upper and lower rectangular sections, ball and socket joints supporting said sections comprising a pair of vertically spaced brackets rigid with the main frame and bearing balls mounted on said brackets, said balls having openings therethrough for the post, a socket member rigid with the upper inner end of each section and having openings for said post, a swivel pin mounted in bearings and connecting said sections at their outer free ends, an articulated set of brushes mounted on the free ends of the sections, and means for rotating the brushes.

2. In a vehicle washer, the combination with a main frame and a vertical hinge post mounted thereon, of a rectangular hinged frame extending laterally to one side of the hinge post and including upper and lower sections each having a ball-and-socket joint at its upper inner edge, said joints being axially alined on the hinge post and supported on the main frame, a swivel joint between said sections at the free vertical edge of the hinged frame remote from the hinge post, an articulate set of axially alined brushes mounted on said free vertical edge, and means for rotating said brushes.

3. In a vehicle washer, the combination with a main frame and a vertical hinge post mounted thereon, of a rectangular hinged frame extending laterally to one side of the hinge post and including a lower section having its lower end rotatable on the post and its upper inner end having a ball-and-socket bearing alined with the hinge post and supported on the main frame, an upper section having a ball-and-socket bearing alined with the post and supported on the main frame, said upper section also including an outer vertical edge bar having a swivel joint with the upper portion of the upper section, and said edge bar at its lower end having a swivel joint with the lower section.

4. In a vehicle washer, the combination with a main frame, of a rectangular hinged frame extending laterally to one side of the frame and including upper and lower sections, each of said sections having an upper swivel bearing supported on the main frame, a horizontally extending swivel pin mounted in bearings on adjoining corners of said sections remote from the main frame, an articulate set of rotary brushes mounted at the free edge of the hinged frame remote from the main frame, and means for rotating said brushes.

5. In a vehicle washer, the combination with a main frame, of a hinged frame extending laterally to one side of the main frame and including upper and lower sections, each of said sections including an upper horizontal bar having a vertical swivel bearing supported on the main frame, said upper section including an outer edge bar, a swivel joint mounted in bearings at the adjoining ends of the edge bar and the horizontal bar of the upper section, a swivel joint mounted in bearings between the lower end of said edge bar and the lower section, an articulate set of rotary brushes mounted at the free end of the hinged frame remote from the main frame, and means for rotating the brushes.

6. In a vehicle washer, the combination with a main frame, a hinge post journaled on the main frame, and a hinged brush frame journaled on the post and supported in bearings on the main frame, said brush frame including a rigid lower rectangular section having upper and lower hinges on the hinge post; an upper section including an upper horizontal bar having a hinge on the hinge post and an outer vertical edge bar, a swivel pin mounted in bearings between the outer end of the horizontal bar and the upper end of the outer vertical bar; and a swivel pin mounted in bearings between the lower end of the edge bar and the upper outer corner of the lower section.

7. In a vehicle washer, the combination with a main frame, a hinge post journaled on the main frame, means for turning the post, and means for retaining the post in adjusted position, of a brush frame extending laterally to one side of the post, said brush frame being journaled on the post and supported in bearings on the main frame and movable in one direction with the post to operative position, and a spring device rigid with the post and resiliently connected with the frame to permit limited movement of the brush frame in the opposite direction.

8. In a vehicle washer, the combination with a main frame, a hinge post journaled on the main frame, means for turning the post to adjusted position, and means for retaining the post in adjusted position, of a brush frame extending laterally to one side of the post, said brush frame being journaled on the post and supported in bearings on the main frame and movable in one direction with the post to operative position, a two-arm lever also fixed on the hinge post, a spring interposed between one arm and the brush frame, and a stop on the brush frame in the path of the other arm.

FRANK B. YINGLING.